W. J. B. TAYLOR.
SCREEN.
APPLICATION FILED MAR. 8, 1918.
1,271,389.
Patented July 2, 1918.
2 SHEETS—SHEET 1.
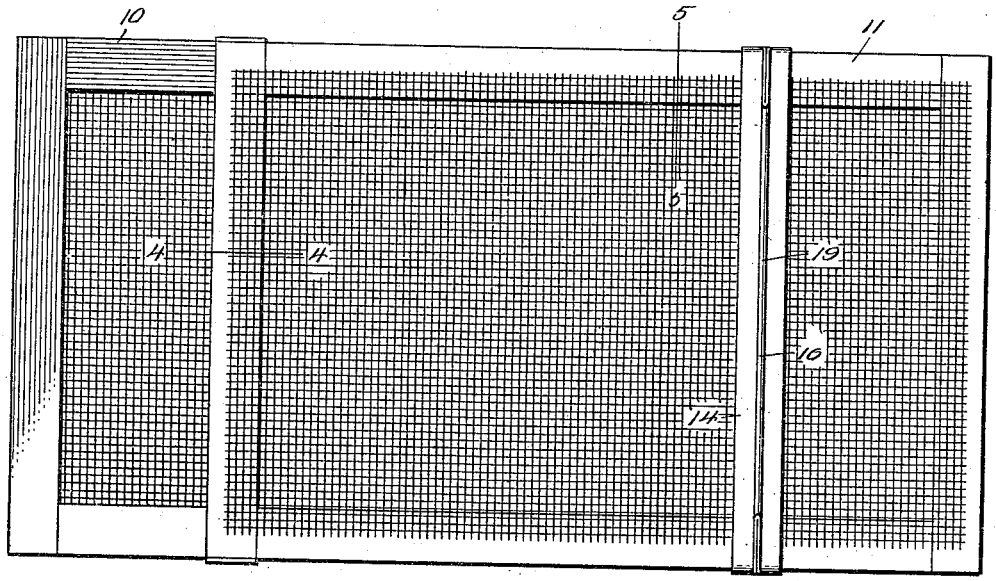
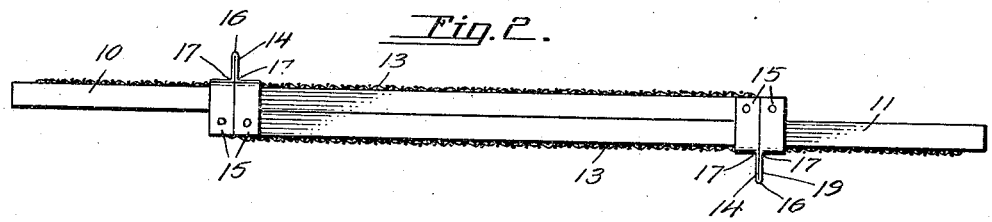
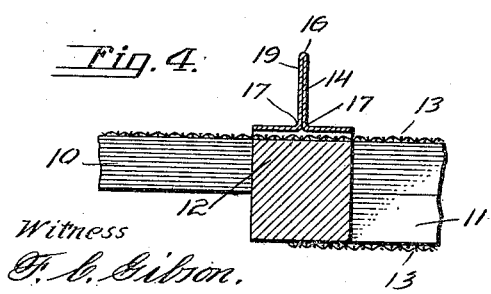
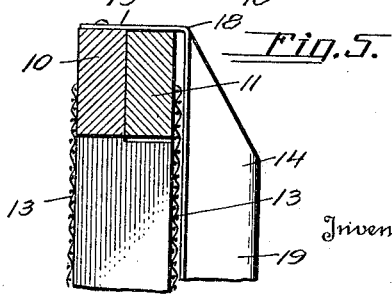
Witness
F. C. Gibson.
Inventor
William J. B. Taylor.
By Victor J. Evans
Attorney W. J. B. TAYLOR.
SCREEN.
APPLICATION FILED MAR. 8, 1918.
1,271,389.
Patented July 2, 1918.
2 SHEETS—SHEET 2.
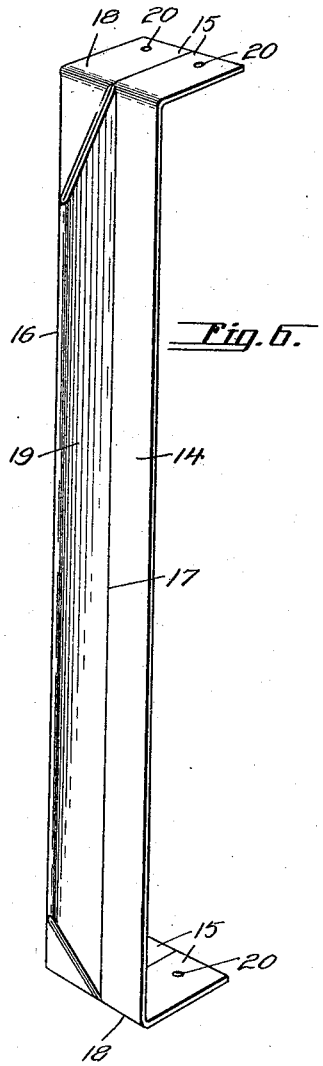
Fig. 6.
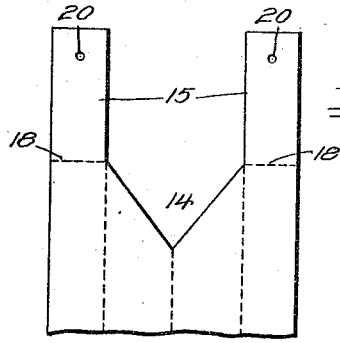
Fig. 7.
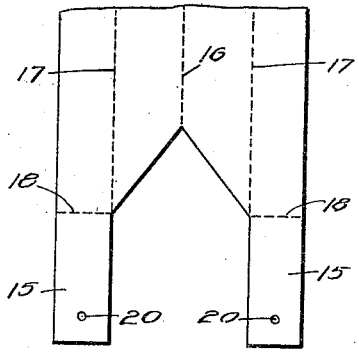
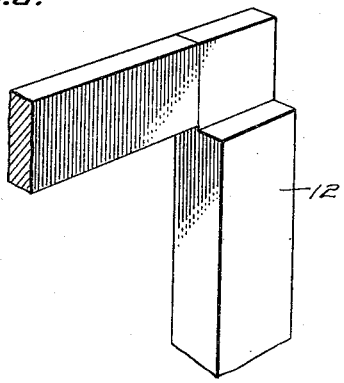
Fig. 8.
Witness
F. C. Gilson.
Inventor
William J. B. Taylor.
By Victor J. Evans.
Attorney

UNITED STATES PATENT OFFICE.

WILLIAM J. B. TAYLOR, OF FINDLATER, SASKATCHEWAN, CANADA.

SCREEN.

1,271,389.	Specification of Letters Patent.	Patented July 2, 1918.

Application filed March 8, 1918. Serial No. 221,265.

*To all whom it may concern:*

Be it known that I, WILLIAM J. B. TAYLOR, a subject of the King of Great Britain, residing at Findlater, in the Province of Saskatchewan and Dominion of Canada, have invented new and useful Improvements in Screens, of which the following is a specification.

This invention relates to window screens of that class composed of a plurality of sections one of which being co-extensively adjustable with respect to the other, and the object of the invention is to produce a simple and cheaply constructed device of this character which will permit of the ready adjustment of the sections with respect to each other which so engages with the mesh or netting as to retain the mesh of one of the frames firmly against the other frame, at the joints between the frames so as to prevent the entrance of flies or other insects between the sections.

I attain the foregoing objects and others by a construction and arrangement of parts, a simple and satisfactory embodiment of which being illustrated by the drawings, and in which, Figure 1 is an elevation of a screen constructed in accordance with this invention.

Fig. 2 is a top plan view of the same.

Fig. 3 is an approximately central longitudinal sectional view through the same.

Fig. 4 is a greatly enlarged detail sectional view approximately on the line 4—4 of Fig. 1.

Fig. 5 is a sectional view approximately on the line 5—5 of Fig. 1.

Fig. 6 is a detail perspective view of one of the metallic guide members of the screen.

Fig. 7 is a plan view of the blank from which the guide member is formed.

Fig. 8 is a detail perspective view looking toward the inner end of one of the screen sections, the guide being removed.

In the drawings the screen comprises two sections 10 and 11 respectively. Each of the sections is similarly constructed and is in the nature of a rectangular frame, the inner stile of which being provided with an outstanding cleat 12. The cleat terminates a suitable distance from the top and bottom edges of the respective sections, being of a length equaling the distance between the upper and lower bars of the frames, so that the cleat 12 of one of the sections, contacting with the inner edges of the longitudinal members of the co-acting frame holds the frames in proper position with respect to each other. The cleats are of the thickness equaling the thickness of the elements comprising the frames, so that the outer faces of the same will be arranged flush with the outer faces of the sections receiving the said cleats.

Preferably the sections 10 and 11, including the cleats 12 are constructed of wood, and upon the opposite faces of the respective sections 10 and 11 is tacked or otherwise secured the wire mesh 13.

From constant use the mesh 13 will sag, but the inner faces of the respective mesh or fabric members 13 are contacted by the outer faces of the respective cleats 12.

To at all times retain the wire mesh 13 in contacting engagement with the outer faces of the cleats 12 I provide metallic members which, for the sake of convenience I will term guides and each of the guides being similarly constructed is broadly indicated by the numeral 14.

Each guide is constructed from a substantially rectangular strip of metal cut from its ends longitudinally providing the said ends with parallel members 15. The strip of metal is then cut inwardly forming a substantially V-shaped opening at the terminals of the inner edges of the members 15. The strip is scored centrally of the V-shaped opening as indicated by the numeral 16 and is also scored in a line with the inner edges of the members 15 as indicated by the numerals 17. In addition to the longitudinal scores, the strip is provided with transverse scores 18 at the terminals of the parallel members. Each of the strips is bent inwardly upon the score 16 and outwardly upon the score lines 17, thus providing the center of each of the strips with a centrally arranged longitudinally extending rib 19. The parallel members 15 are bent at a right angle with respect to the strip in an opposite direction from the rib 19. thus providing the ends of each of the guide members with ears that have openings 20 therethrough. The angle ends or ears provided by the members 15 of the respective guides are secured to the opposite ends of the vertical inner stiles of the frame sections 10 and 11 by suitable headed elements passing through the openings 20. It will thus be noted that the angle ends of the guides secured to one of the sections surrounds the other section providing a guide between the sections. By providing each of the guides with the ribs 19 the flat faces thereof are materially reinforced so that an out-bulging thereof will be prevented. The ends of the ribs 19 are arranged at a downward inclination so that the ribs are in reality in the nature of truss members and will have a tendency to force the flat faces of the guides against the wire mesh 13 of the respective sections and against the outer faces of the cleats 12 which are arranged opposite the guides 14, so that danger of insects passing between the cleats and the mesh 13 will be effectively overcome. In addition to this the guides 14 materially reinforce the screen sections 10 and 11 at the inner ends thereof.

Having thus described the invention, what I claim is:

1. A window screen comprising frames one slidable over the other, each of said frames, upon its inner end having an outwardly extending cleat received in and contacting with the longitudinal members of the adjacent frame, and said cleats being of a width equaling the thickness of the frames, a metallic guide on the end of each of the frames and straddling the adjacent frame, and exerting a tension toward the cleat of the said adjacent frame, and each of said guides being centrally bent upon itself to provide an outstanding rib and flanges formed on the inner edges of said rib and extending laterally from the rib and designed to be influenced by the rib to cause the same to assume a slight angle with respect to the rib and to be thus brought into frictional engagement with the respective frames.

2. A window screen comprising two substantially rectangular frames one slidable over the other, cleats formed on the inner members of each of the frames and received in the adjacent frame and having its ends contacting with the inner edges of the longitudinal elements on the said adjacent frame, a guide secured to the end of each of the frames and surrounding the adjacent frame, said guides being each constructed of a strip of metal cut inwardly from the ends thereof and centrally bent upon itself to provide a rib and flat right angular portions arranged to the opposite sides of the rib, and the ends of the said member, outward of the rib, being bent at a right angle to the rib and to the straight faces of the guide and secured to the frames.

In testimony whereof I affix my signature.

WILLIAM J. B. TAYLOR.